United States Patent [19]

Kaneda et al.

[11] Patent Number: 5,428,284
[45] Date of Patent: Jun. 27, 1995

[54] METHOD OF AND CIRCUIT FOR STARTING SENSORLESS MOTOR

[75] Inventors: Isao Kaneda, Ohtsu; Kouhei Yonemura, Youkaichi; Akihiro Okubo, Hikone, all of Japan

[73] Assignee: Nippon Densan Corporation, Kyoto, Japan

[21] Appl. No.: 275,071

[22] Filed: Jul. 13, 1994

Related U.S. Application Data

[63] Continuation of Ser. No. 961,497, Oct. 15, 1992, which is a continuation of Ser. No. 722,897, Jun. 28, 1991, Pat. No. 5,235,264.

[30] Foreign Application Priority Data

Jun. 30, 1990 [JP] Japan ............................. 2-173890
Jan. 14, 1991 [JP] Japan ............................... 3-14707
Mar. 29, 1991 [JP] Japan ............................... 3-65845

[51] Int. Cl.$^6$ ............................................. H02P 7/36
[52] U.S. Cl. ................................. 318/778; 318/138; 318/696; 318/254
[58] Field of Search ............ 318/778, 800, 727, 375, 318/759, 801, 802, 788, 696, 500, 254, 138, 685, 439; 321/5; 323/211

[56] References Cited

U.S. PATENT DOCUMENTS

| | | | |
|---|---|---|---|
| 3,689,813 | 9/1972 | Sawyer et al. | 318/200 |
| 3,707,668 | 12/1972 | Johnston | 321/5 |
| 3,969,661 | 7/1976 | Morinaga et al. | 318/375 |
| 4,641,066 | 2/1987 | Nagata . | |
| 4,706,005 | 11/1987 | Iwako . | |
| 4,710,691 | 12/1987 | Bergstrom et al. | 318/696 |
| 4,719,398 | 1/1988 | Paice | 318/806 |
| 4,874,993 | 10/1989 | Tanaka et al. | 318/254 |
| 4,928,043 | 5/1990 | Plunkett | 318/721 |
| 5,001,405 | 3/1991 | Cassat | 318/138 |
| 5,019,256 | 5/1991 | Schwarz | 318/254 |
| 5,049,793 | 9/1991 | Tanaka et al. | 318/758 |
| 5,134,355 | 7/1992 | Hastings | 323/211 |

FOREIGN PATENT DOCUMENTS

| | | |
|---|---|---|
| 0382887 | 8/1989 | European Pat. Off. . |
| 2590423 | 11/1985 | France . |
| 4009258 | 10/1990 | Germany . |

OTHER PUBLICATIONS

Drive Method for Torque-up of Sensorless Motor (Jun. 1990) vol. 16, pp. 470-472, IBM Tech. Disc. Bulletin.
Multilevel Tuned Torque Amplification Routine (Aug. 1990), vol. 33, No. 3A, pp. 215-218, IBM Tech. Disc. Bul.

*Primary Examiner*—John W. Cabeca
*Attorney, Agent, or Firm*—McCormick, Paulding & Huber

[57] ABSTRACT

A driving control circuit of a sensorless motor having a stator and a rotor, used for a magnetic disk device, comprising a high-frequency stepping oscillator, stepping oscillator, a timer, a stepping timing generating circuit, a current switching logic, an output driver, and a counter electromotive force detecting circuit, wherein three-phase driving coils are connected to an output driver. For starting, a high frequency stepping step a holding step where current flow conditions are held without switching currents to the driving coils, are executed; then, currents to the driving coils are inverted to obtain a reversed excited condition; and, after performing a stepping step for starting the motor is controlled at a steady rotating speed by detecting counter electromotive forces.

3 Claims, 8 Drawing Sheets

METHOD OF AND CIRCUIT FOR STARTING SENSORLESS MOTOR

This is a continuation of U.S. patent application Ser. No. 07/961,497, filed Oct. 15, 1992, which is a continuation of U.S. patent application Ser. No. 07/722,897, filed Jun. 28, 1991, now U.S. Pat. No. 5,235,264.

BACKGROUND OF THE INVENTION

1. Field of the Invention

This invention relates to a method of and a circuit for starting a sensorless motor, and in particular to such method and circuit capable of improving a starting performance of the sensorless motor in which permanent magnets and driving coils are provided in its rotor and stator respectively, and wherein no sensor like a Hall element is provided in detecting a rotor position.

2. Related Art Statement

When a rotor having permanent magnets travels neighborhood of coils of a motor, electromotive force is produced in the motor coils due to variation of a magnetic field. Accordingly, during the rotation of the rotor, even if a position detecting element for rotor is not provided, the position of the rotor is detected by measuring an electromotive force produced in the motor coils.

In a driving circuit of a sensorless motor, a conversion circuit is provided for converting electromotive force produced in the motor coils into signals, and the signals thus converted are used as rotor position signals to operate the circuit.

However, at the time when the motor is intended to start, the motor is in a stopped state and an electromotive force is not yet generated in the coils. Thus, the motor must be started under an unknown condition as to the present position of the rotor. In a stepping step of such a start, an exciting procedure is employed wherein the rotor is caused to rotate in the forward direction in a predetermined sequence of operation irrespective of the relative positions of the stator coils and the permanent magnets of the rotor.

FIG. 10 shows a circuit diagram of a driver of a sensorless motor in the conventional technique. Driving coils of a motor 21 is supplied with an exciting current from an output circuit 23 controlled by a control circuit 22. During rotating of the motor, an electromotive force produced in the driving coils is detected by a detecting circuit 24 and supplied to the control circuit 22 as a rotor position signal. Based on this position signal, the control circuit causes the output circuit 23 to turn on or off and allows the rotor to rotate in the specified direction.

At the time when the starting operation of the motor is intended, the motor is not yet rotated, thus no output is obtained from the detecting circuit 24. And, a switch 27 is connected to a starting circuit 25 which supplies signals to the control circuit 22 for exciting the driving coils in a predetermined sequence of operation. Then, the rotor starts to rotate, and an electromotive force is generated in the driving coils. Now, therefore, the switch 27 is switched to the detecting circuit 24.

However, a predetermined procedure is performed for exciting the coils irrespective of the rotor position, therefore, there arises a case where the rotor moves slightly in the reverse direction in the beginning, or a case where rotating force is small even though the rotor rotates in the correct direction. In such cases, the rotor does not reach a required rotating speed even after a predetermined time lapses. To cope with such failure of starting, a control system as in FIG. 11 is generally used. Namely, after it is instructed to start the control, start/brake signals S/B is switched from a high level to a low level as shown in step S1 so as to begin starting step of the motor. Referring to the circuit of FIG. 10, the switch 27 is connected to the starting circuit 25, and the signals for exciting the stator coils at a predetermined sequence are fed to the control circuit 22. The driving coils of the motor 21 are excited based on these signals.

After executing the specified starting procedure, it is determined in step S2 whether or not the motor is started, by detecting an electromotive force induced in the driving coils (detecting mode). For example, when 90% or above of a predetermined rotating speed has been obtained, the starting is determined as a success.

In success of the starting, the motor is accelerated up to a constant rotating speed.

In failure of the starting, switching S/B signals are changed from Low to High, and a predetermined braking is performed (step S3). This is referred to as a braking step. Thereafter, S/B signals are again changed from High to Low, the starting step being reexecuted.

For example, in case of a driving motor for a magnetic disk of a personal computer, the driving of the magnetic disk is instructed at the same time when the switch of the personal computer is turned on. Generally, starting-up operation of the disk must be completed within about 10 seconds. Accordingly, a counter is prepared to count the number of failures of the starting. If the number of failures reaches the predetermined one, for example 8 times, then the display of the personal computer is caused to display a message of "depress the reset button" or the like for repeating the starting-up operation.

As described above, the starting procedure of the sensorless motor is performed without confirming a position of the rotor. Therefore, it is unavoidable to result in starting failures even in small probability. For example, a starting failure occurs once per 1000 times. If the starting fails, the braking step begins whereby the motor is braked to stop, and returns to an initial condition. Then, the motor is started by the starting step again. Here, the repeated starting steps are independent of each other. Assuming a probability of failure is 1/1000 at each starting mode, and if the starting mode is repeated two times, then a probability of failures is still 1/1000 for each time. Therefore, it is desired to reduce the failures of starting as much as possible. If starting fails, there is a threat that a magnetic head, i.e. a reading and/or writing head, does not float up, and is destroyed.

SUMMARY OF THE INVENTION

An object of this invention is to provide a method of and circuit for starting a sensorless motor capable of improving a starting performance by greatly reducing probability of starting failures using a simple construction.

Another object of the invention is to provide a method and circuit for starting a sensorless motor for preventing a head sticking, in particular, in spindle motor of a magnetic disk device.

Still another object of the invention is to provide a method of and circuit for starting a sensorless motor intended for making a motor start and reach a predetermined rotating speed in a short time, thus reducing a starting time of the motor.

Among the inventions herein disclosed, the representative one is outlined as follows.

Namely, a method and a circuit for starting a sensorless motor, according to the invention, are ones for a sensorless motor having a stator and a rotor, the stator being provided with driving coils to generate electromagnetic field in an excited state, and the rotor being provided with permanent magnets for producing a rotating force by an electromagnetic interaction with the stator. According to the method of the invention, a holding step for holding states of current-flowing of the driving coils is executed without switching the current to the driving coils, then, after the holding step, the switching of the current to the driving coils is inverted to execute a stepping step in which a stepping signal for allowing the rotor to rotate in the predetermined direction is supplied to the driving coils in a reversely excited condition of the driving coils.

Further, according to the method of the invention, a high-frequency stepping step is executed before said holding step. In the high-frequency stepping step, a high-frequency stepping signal having a higher frequency than the frequency of the stepping signal is supplied to the driving coils.

Furthermore, before the holding step, is executed an initial stepping step where a initial stepping signal is provided to the driving coils for rotating the rotor in the predetermined direction.

In this case, after the initial stepping step, is executed an initial accelerating/constant speed step where an initial accelerating/constant speed signal for allowing the rotor to rotate in an accelerating or constant speed in a predetermined direction is supplied to the driving coils.

According to the above method and circuit for starting the sensorless motor, after the holding step, the exciting direction of the driving coils is inverted to execute the stepping step, so that larger torque is obtained than the beginning of the starting, thus improving starting ability.

It is possible to generate only vibration in the rotor by executing the high-frequency stepping step using the high-frequency stepping signal having a higher frequency than the frequency of the stepping signal, before the holding step. This enables to prevent a head sticking against the magnetic disk when used, for example, in the magnetic disk device.

Still more, the initial stepping step is executed with the initial stepping signal before the holding step, and after the initial stepping step and the stepping step, the initial accelerating/constant speed step and an accelerating/constant speed step are executed respectively with the initial accelerating/constant speed signal and the accelerating/constant speed signal. By this, it is possible to reliably start and reach the predetermined rotating speed in a shorter time, thus improving reliability of the starting operation, and reducing starting time.

BRIEF DESCRIPTION OF THE DRAWINGS

The above and other objects and features of the present invention will become more apparent when referred to the following descriptions given in conjunction with the accompanying drawings, in which.

DETAILED DESCRIPTION OF THE PREFERRED EMBODIMENTS

Embodiment 1

Figure 1:
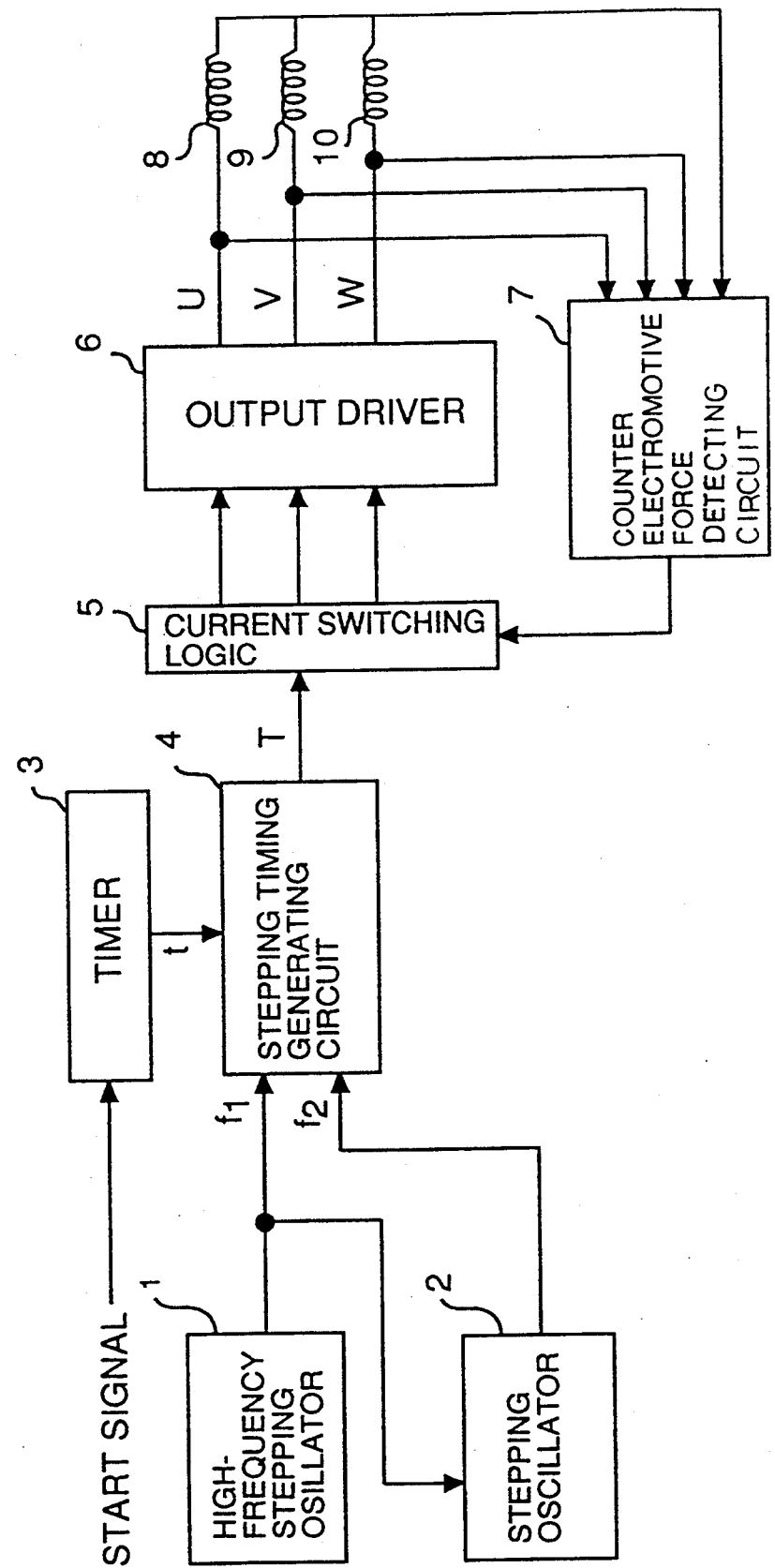
FIG. 1 is a schematic block diagram showing a constitution of a driving control circuit of Embodiment 1 of the method and circuit for starting a sensorless motor according to the present invention.
Figure 2:
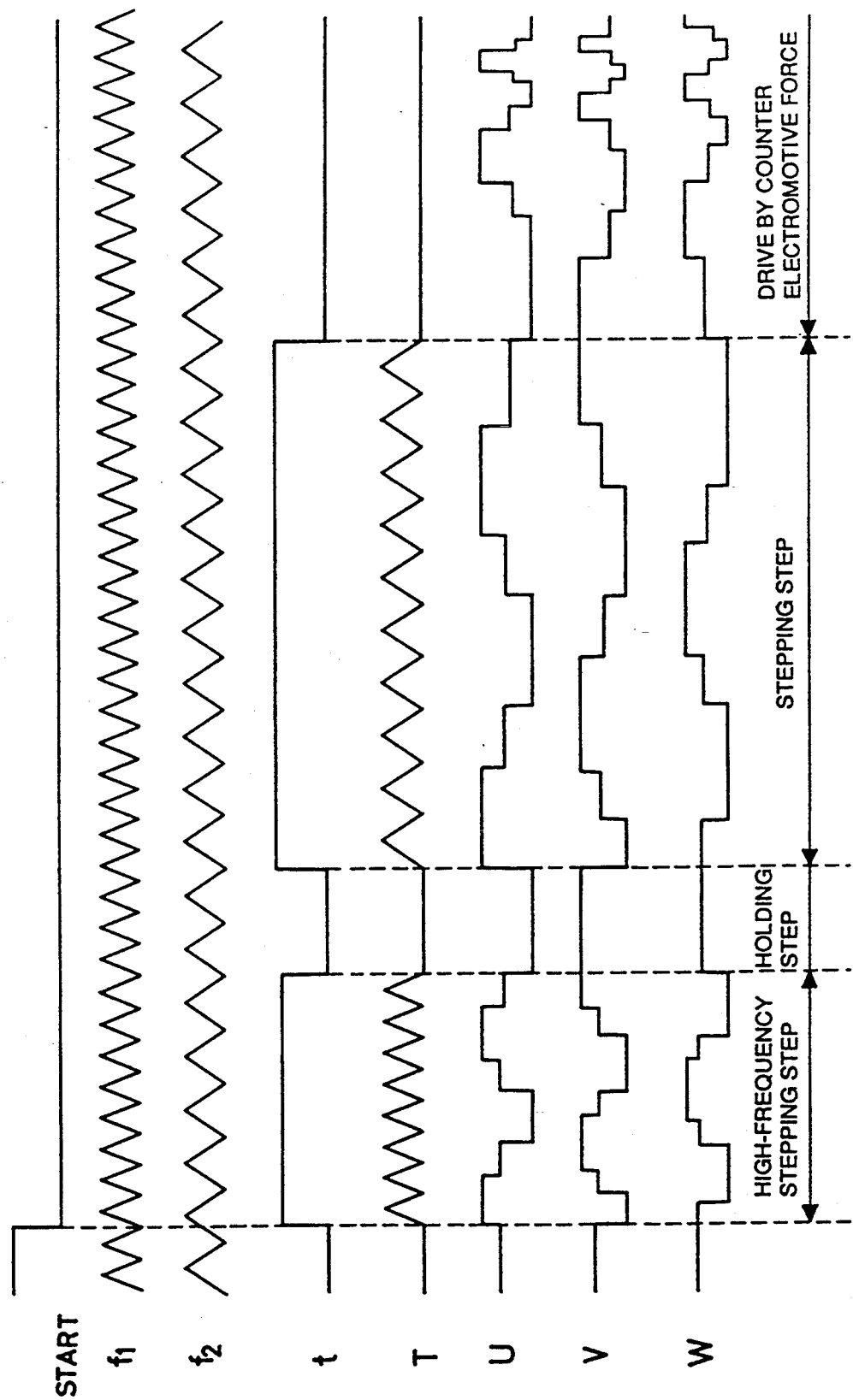
FIG. 2 is a wave form chart showing each output wave form in the driving control circuit in Embodiment 1.
Figure 3:
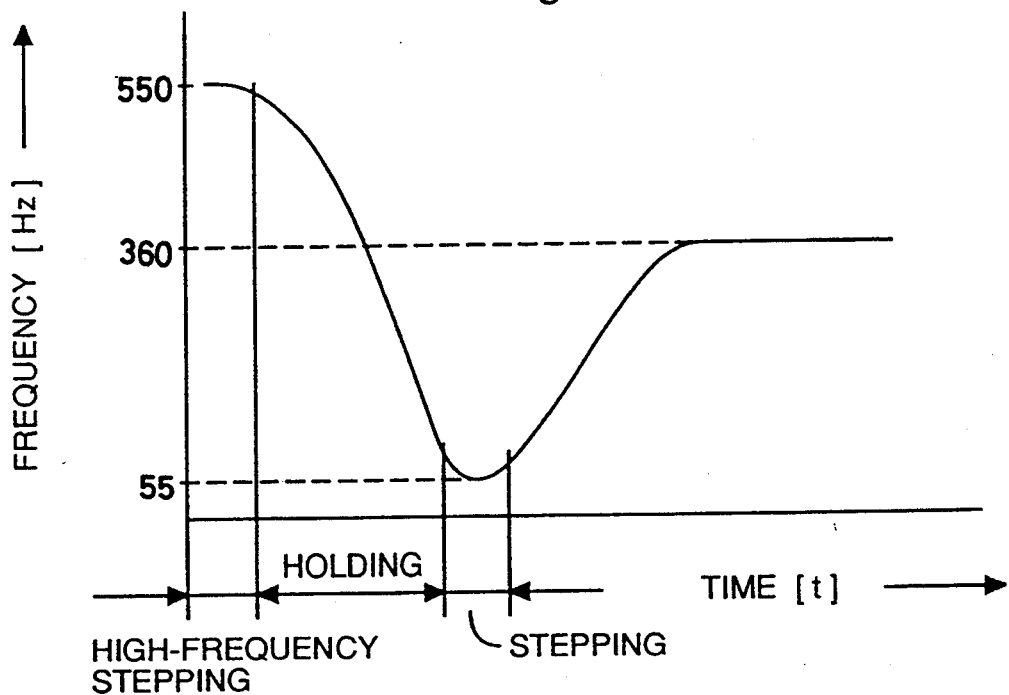
FIG. 3 graphically illustrates a starting characteristic of the driving control circuit in Embodiment 1.
Figure 4:
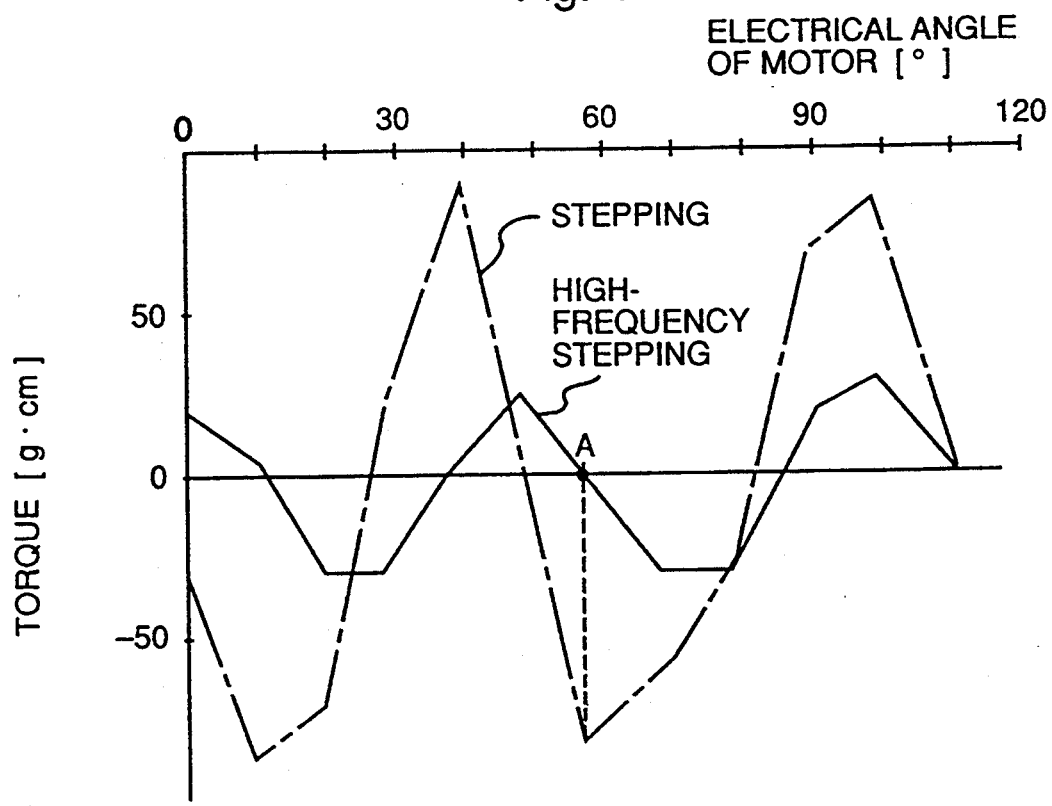
FIG. 4 graphically illustrates a torque characteristic of the driving control circuit in Embodiment 1.

FIG. 1 is a schematic block diagram showing a constitution of driving control circuit of one embodiment of the method and circuit for starting a sensorless motor according to the present invention;

FIG. 2 is a wave form chart showing each output wave form of the driving control circuit in the present embodiment; FIG. 3 is a graphical illustration of a starting characteristic of the driving control circuit in the embodiment; and FIG. 4 is a graphical illustration for a torque characteristic of the driving control circuit in the embodiment.

Referring to FIG. 1, a construction of a driving control circuit of a sensorless motor in the present embodiment will be described as follows.

A driving control circuit according to the present embodiment is used, for example, for a spindle motor of a magnetic disk device, i.e. a sensorless type brushless motor provided with a stator which generates electromagnetic field in an excited condition, and a rotor to obtain a rotating force by an electromagnetic interaction with the stator. The driving control circuit comprises a high-frequency stepping oscillator 1 as a high-frequency stepping signal generating means, a stepping oscillator 2 as a stepping signal generating means, a timer 3, a stepping timing generating circuit 4, a current switching logic 5, output driver 6, and a counter electromotive force detecting circuit 7, and driving coils (U, V, W) 8 to 10 for three-phase driving are connected respectively to output terminals of the output driver 6.

When starting the motor, as shown in FIG. 3, a holding step is performed for holding the current-flowing condition before a stepping step, without switching the current to the driving coils 8 to 10. After the holding step, the switching of the current to the driving coils 8 to 10 is inverted. Thus, the stepping step is executed wherein a stepping signal allowing the rotor to rotate in the specified direction under the reversed excited condition, is fed to the driving coils 8 to 10.

Before the holding step, a high-frequency stepping step is performed wherein the high-frequency stepping signal having higher frequency than the stepping signal of the stepping step, is fed to the driving coils 8 to 10. Further, after the predetermined rotating speed is achieved, the motor is controlled to a steady rotating speed by detecting a counter electromotive force.

In this embodiment, the high-frequency stepping oscillator 1 generates a high-frequency stepping frequency (f1), for example, of 550 Hz about 10 times the stepping frequency (f2), causing the rotor to only generate slight vibration, and thus making the head float to prevent head sticking against the magnetic disk.

As described, the high-frequency stepping frequency (f1) is set at about 10 times the stepping frequency (f2), however, it can be varied in a range from 4 to 12 times, and preferably from 8 to 10 times.

The stepping oscillator 2 divides the high-frequency stepping frequency into about 1/10, and generates the stepping frequency (f2), for example, about 55 Hz which is almost same as a proper vibration frequency of the motor, and amplifies the vibration of the rotor for rotating it.

The timer 3 sets the timing of the high-frequency stepping step and the stepping step, and the timing of the predetermined holding step therebetween.

The stepping timing generating circuit 4 adjusts timing of the frequencies to correspond to the respective steps according to the timing from the timer 3, i.e. adjusts the high-frequency stepping frequency from the high-frequency stepping oscillator 1 and the stepping frequency from the stepping oscillator 2, to correspond to the high-frequency stepping step and the stepping step, respectively.

The current switching logic 5 receives output of the stepping timing generating circuit 4, and, depending on it, controls the output driver 6 with respect to the current flowing times of the driving coils 8 to 10, corresponding to the high-frequency stepping step, the holding step and the stepping step.

The output driver 6 turns on or off the current flows of the driving coils 8 to 10 depending on the control of the current switching logic 5, and also instantly switches the driving coils 8 to 10 to a reversely excited condition at the holding step.

After a predetermined rotating speed is achieved, the counter electromotive force detecting circuit 7 detects a counter electromotive force of the driving coils 8 to 10, and a resultant output is fed back to the current switching logic 5 for holding the specified steady rotating speed.

Operation of the present embodiment will be explained based on the wave form chart in FIG. 2.

For starting the motor, at the same time as input of a start signal, the high-frequency stepping step by high-frequency stepping frequency (wave form f1), which is output of the high-frequency stepping oscillator 1, is executed during the time (wave from t), for example 16 milliseconds (ms), set by the timer 3, in accordance with a timing signal (wave form T) adjusted by the stepping timing generating circuit 4.

In this step, the currents (wave form U, V, W) having a frequency as large as 10 times the proper vibration frequency of the motor are supplied to the driving coils 8 to 10 through the current switching logic 5 and the output driver 6, therefore, the rotor only slightly vibrates without amplifying its vibration. Thus, it is possible to eliminate head sticking between the magnetic disk and the head.

Under the condition where the head sticking is released, the predetermined holding step of, for example, 10 ms set by the timer 3 (wave form t), holds flow states of currents without switching current directions to the driving coils 8 to 10 by the output driver 6, and thereafter, substantially without having pausing step, the current directions are inverted in reverse of the exciting direction of the high-frequency stepping step.

As seen from FIG. 4 which shows a torque characteristic relating an electrical angle of the motor to a rotating torque as a measurement in the state where the hub of the spindle motor is not locked, because of this inversion to the reversed exciting direction, rotating torque at the outset of the stepping step can be raised several times the rotating torque of the point where the high-frequency stepping step is ceased, for example at A. This stepping step will described later in this specification.

Namely, the high-frequency stepping step, for example, switches current polarities of the driving coils 8 to 10 from "+" or "−" to "0", and from "0" to "+" or "−", while, at the outset of the stepping step, the polarities are switched from "+" to "−" or from "−" to "+". This increases the distance of the variation of flux density in B-H curve, and therefore torque is increased and it becomes possible to improve the starting ability of the motor.

In this case, the rotation of motor can be boosted up to the steady rotating speed by starting the stepping step with the reversed exciting condition, substantially without providing pausing step after the end of the holding step.

After the inversion to the reversed exciting direction, the stepping step by the stepping frequency (wave form f2) which is the output of the stepping oscillator 2, is performed. Then, unlike the high-frequency stepping step, because substantially the same frequency as the proper frequency is supplied to the driving coils 8 to 10, vibration of rotor is amplified, and the rotor is given of a larger rotating force. Thus, the rotor is rotated in the predetermined direction at a larger rotating torque.

When the steady rotation of rotor is achieved, then counter electromotive forces of the driving coils 8 to 10 are detected by the counter electromotive force detecting circuit 7, which then processes this output signals of counter electromotive force in their wave forms, so that, as in the case where a conventional sensor such as a Hall element is used, the rotor is synchronizedly controlled at a constant level of the rotating speed by driving in accordance with the counter electromotive force.

Thus, according to the embodiment of the driving control circuit of the sensorless motor, which is provided with the high-frequency stepping oscillator 1 and the stepping oscillator 2, the motor can reliably be started and achieve the predetermined rotating speed by executing the stepping step inverting the driving coils 8 to 10 to the reversed exciting direction after the holding step. At the same time, the starting performance of the motor is improved by increasing the torque of the rotor by about several times.

Furthermore, the high-frequency stepping step is executed before the stepping step, so that the rotor is able to generate only vibration, and it becomes possible to prevent the sticking of the head and the magnetic disk.

In this embodiment, the high-frequency stepping step is provided before the holding step. However, if there is no problem of the head sticking, the high-frequency stepping step can be omitted.

Embodiment 2

Figure 5:
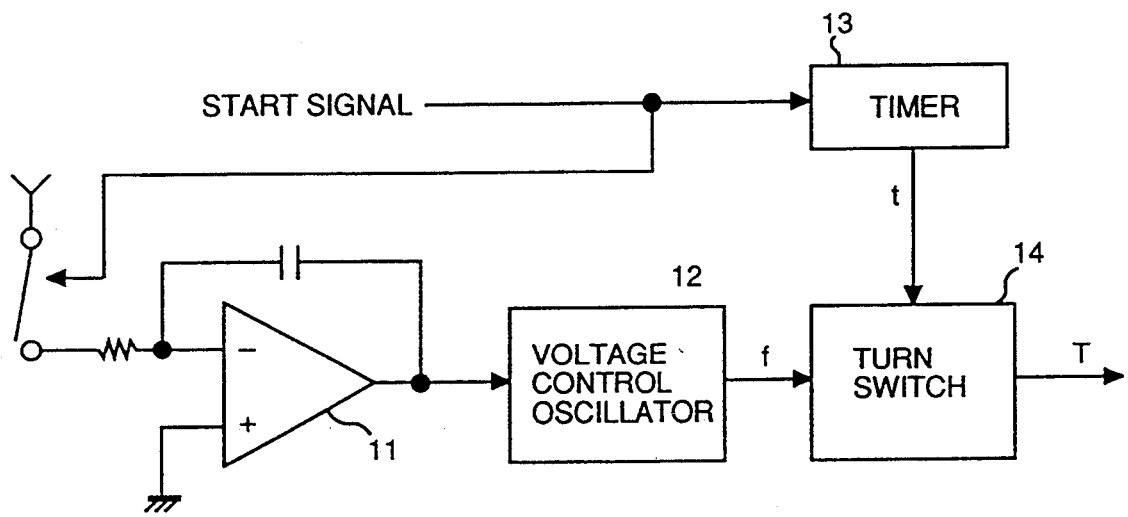
FIG. 5 is a schematic block diagram showing an essential part of the driving control circuit of Embodiment 2 of the method and circuit for starting a sensorless motor according to the invention.
Figure 6:
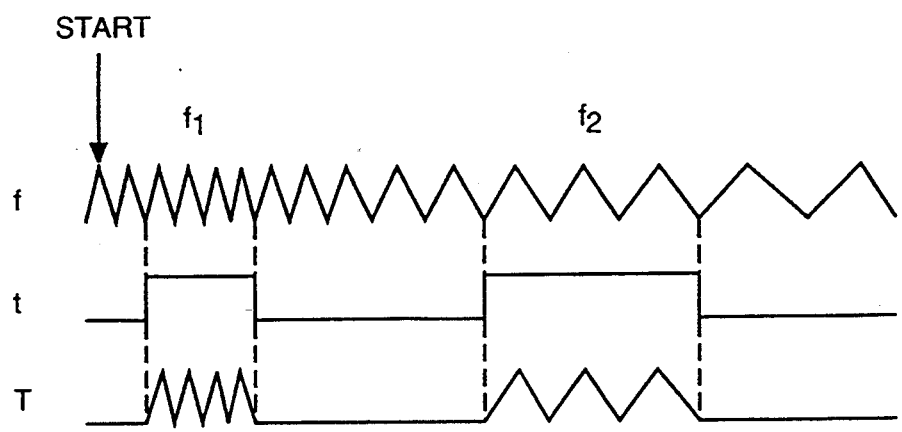
FIG. 6 is a wave form chart showing each output waveform in an essential part of the driving control circuit in Embodiment 2.

FIG. 5 is a schematic block diagram showing an essential structure of a driving control circuit of another embodiment of the method and circuit for starting a sensorless motor according to the invention, and FIG. 6 is a wave form chart showing each output wave form in the essential structure of the driving control circuit in the present embodiment.

As in Embodiment 1, a driving control circuit in this embodiment is for a spindle motor of a magnetic disk device, having a stator and a rotor. Referring to FIG. 5, the driving control circuit comprises an integrator 11, a voltage control oscillator 12 as a high-frequency stepping signal and a stepping signal producing means, a timer 13, a turn switch 14 and the like. It is different from Embodiment 1 in that frequencies of a high-frequency stepping step and a stepping step are set by the integrator 11 and the voltage control oscillator 12.

Namely, the voltage control oscillator 12 varies its output frequency responding to output voltage from the integrator 11. An oscillating frequency of the output frequency can be varied linearly in a predetermined range as shown in FIG. 6 as wave form f. For example, 550 Hz within the range is substantially set as the high-frequency stepping frequency (f1), and 55 Hz within the range is substantially set as the stepping frequency (f2). In this case, a timing signal of wave form T is obtained by time setting of the timer 13 like wave form "t" and switching of the turn switch, and thus, both the high-frequency stepping and the stepping are set at a required frequency.

Therefore, according to the driving control circuit of the sensorless motor in the present embodiment, because the high-frequency stepping and the stepping frequency can be set by the integrator 11 and the voltage control oscillator 12 and the like, it is possible to improve the starting characteristic realizing a stable starting operation by the stepping step after the holding step as in Embodiment 1. And, also, it is possible to prevent a sticking between a head and a magnetic disk by the high-frequency stepping step.

Embodiment 3

Figure 7:
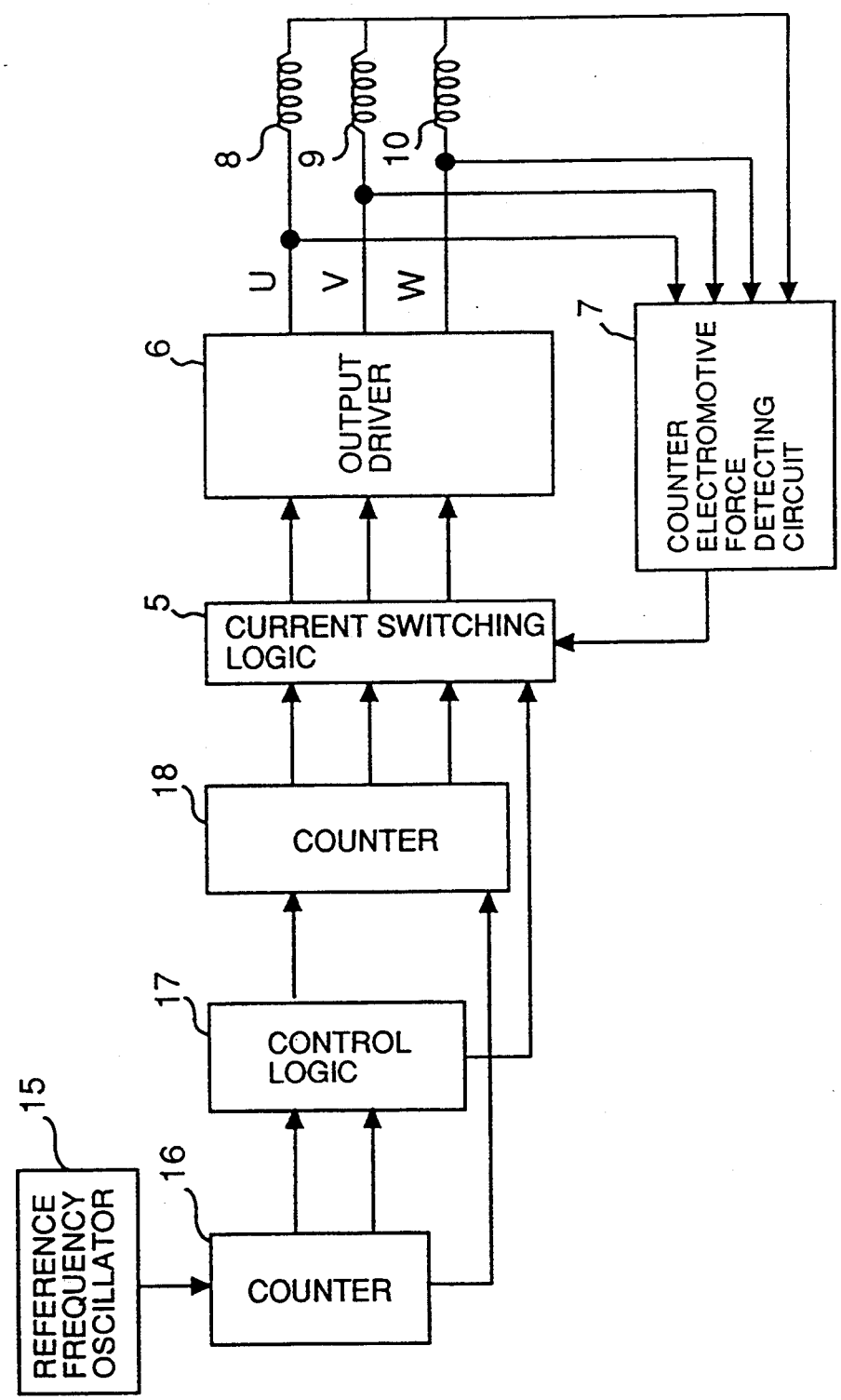
FIG. 7 is a schematic block diagram showing a driving control circuit of Embodiment 3 of method and circuit for starting a sensorless motor according to the present invention.
Figure 8:
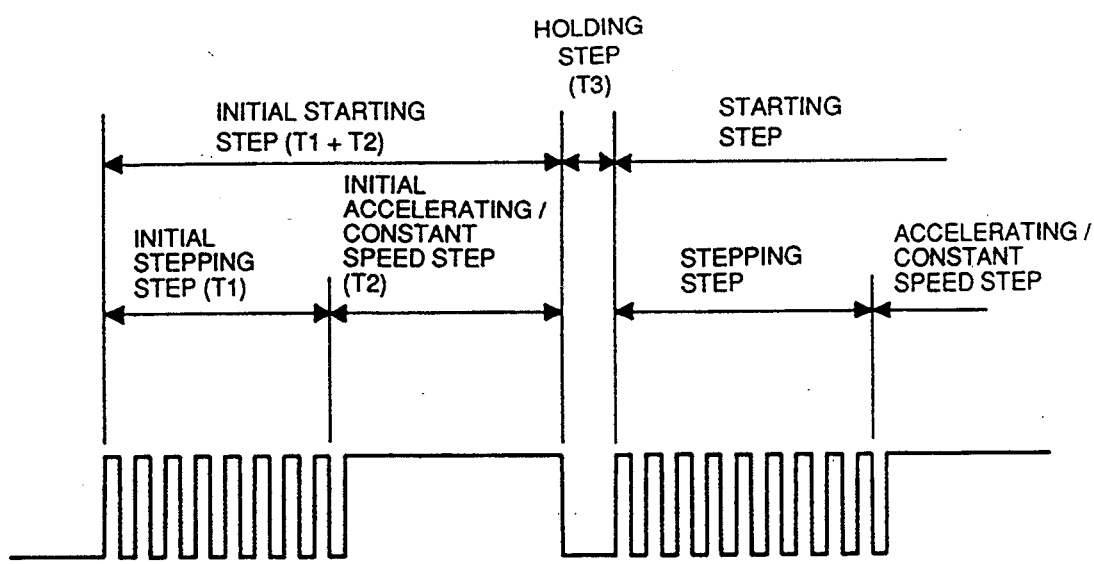
FIG. 8 is a wave form chart showing an output wave form of the driving control circuit in Embodiment 3.

FIG. 7 is a schematic block diagram showing a driving control circuit of another embodiment of the method and circuit for starting a sensorless motor according to the present invention; FIG. 8 is a wave form chart showing an output wave form in the driving control circuit in the present embodiment; and FIG. 9 graphically illustrates variation of a rotating speed in the driving control circuit in the embodiment.

A driving control circuit of the present embodiment, as in Embodiments 1 and 2, is used for a spindle motor of a magnetic disk device, having a stator and a rotor. Referring to FIG. 7, the driving control circuit comprises a reference frequency oscillator 15 as an initial stepping signal and a stepping signal producing means, a counter 16, a control logic 17, a counter 18 and the like. It is different from Embodiments 1 and 2 in that, in place of the high-frequency stepping step, an initial stepping step and an initial accelerating/constant speed step are executed. The initial stepping step supplies an initial stepping signal to the driving coils 8 to 10. And after the initial stepping step, an initial accelerating/constant speed step supplies an accelerating/constant speed signal, which allowing the rotor to rotate in the predetermined direction at an accelerating or constant rotating speed, to the driving coils 8 to 10.

Thus, as shown in FIG. 8, in starting the motor, the driving signal comprises an initial starting step including the initial stepping step and the initial accelerating/constant speed step, and a starting step including the stepping step and the accelerating/constant speed step, and a holding step therebetween. The holding step exists as in Embodiments 1 and 2, and favorably, time T3 of the holding step is about 5 to 30 ms, for example.

The initial starting step includes the initial stepping step for supplying the initial stepping signal, which is substantially same as the stepping signal of the stepping step, to the driving coils 8 to 10; and the initial accelerating/constant speed step for supplying an initial accelerating/constant speed signal to the same. As the initial stepping signal, a signal of lower frequency than the stepping signal can be used. The stepping signal produced from the stepping step is composed of pulse signals. In an example of such step, stepping pulses with the number of 9 is supplied to the driving coils 8 to 10. In this case, time T1 of the initial stepping step is desirably about 30 to 500 ms. If the time T1 is shorter, the motor does not start to rotate satisfactorily. If the time T1 is longer, it makes time for the motor to start longer.

In the initial accelerating/constant speed step, as described later, electromotive forces induced in the driving coils 8 to 10 is detected, and a position of a rotating angle of rotor is detected from the induced electromotive forces. Based on such obtained angle position of the rotor, currents are delivered to the driving coils 8 to 10 as required. Favorably, time T2 of the initial accelerating/constant speed step is as 1.5 to 4.0 times as the time T1 of the initial stepping step (T2/T1=1.5 to 4.0), for example. According to the inventor's experiments, if a ratio (T2/T1) of the time T2 of the initial accelerating/constant speed step to the time T1 of the initial stepping step is smaller, starting reliability is degraded. When the ratio (T2/T1) is set at above 1.5, desired reliability has been obtained. Moreover, in a larger ratio (T2/T1), though satisfactory reliability of starting is obtained, the starting time of motor becomes longer. When the ratio (T2/T1) is set at below 4.0, both of a starting reliability and the shorter starting time are obtained. In case where the counter 16 is used in a starting circuit, and signals from the counter 16 is divided to produce the first starting signal, then a construction of the circuit is easily obtained if the ratio (T2/T1) is set to an integer. In the present case, therefore, it is favorable that the ratio (T2/T1) is set at 2 or 3.

On the other hand, the starting step, like the initial starting step, includes the stepping step for supplying the stepping signal to the driving coils 8 to 10; and the accelerating/constant speed step for supplying the accelerating/constant speed signal to the same.

The time of the stepping step is set, for example, also at about 30 to 500 ms. However, the number of pulses in the stepping step can be made smaller than the initial stepping step, for example 6, because the rotor is rotating to some extent in the outset of the stepping step.

In the accelerating/constant speed step, current is delivered to the driving coils again based on the electromotive force induced from the driving coils, and after this accelerating/constant speed step, the motor is kept at the predetermined rotating speed.

Figure 9:
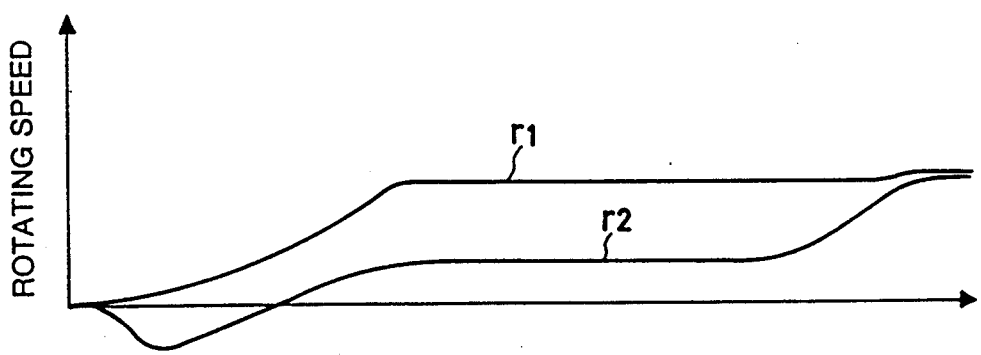
FIG. 9 graphically illustrates change of a rotating speed in the driving control circuit in Embodiment 3.
Figure 10:
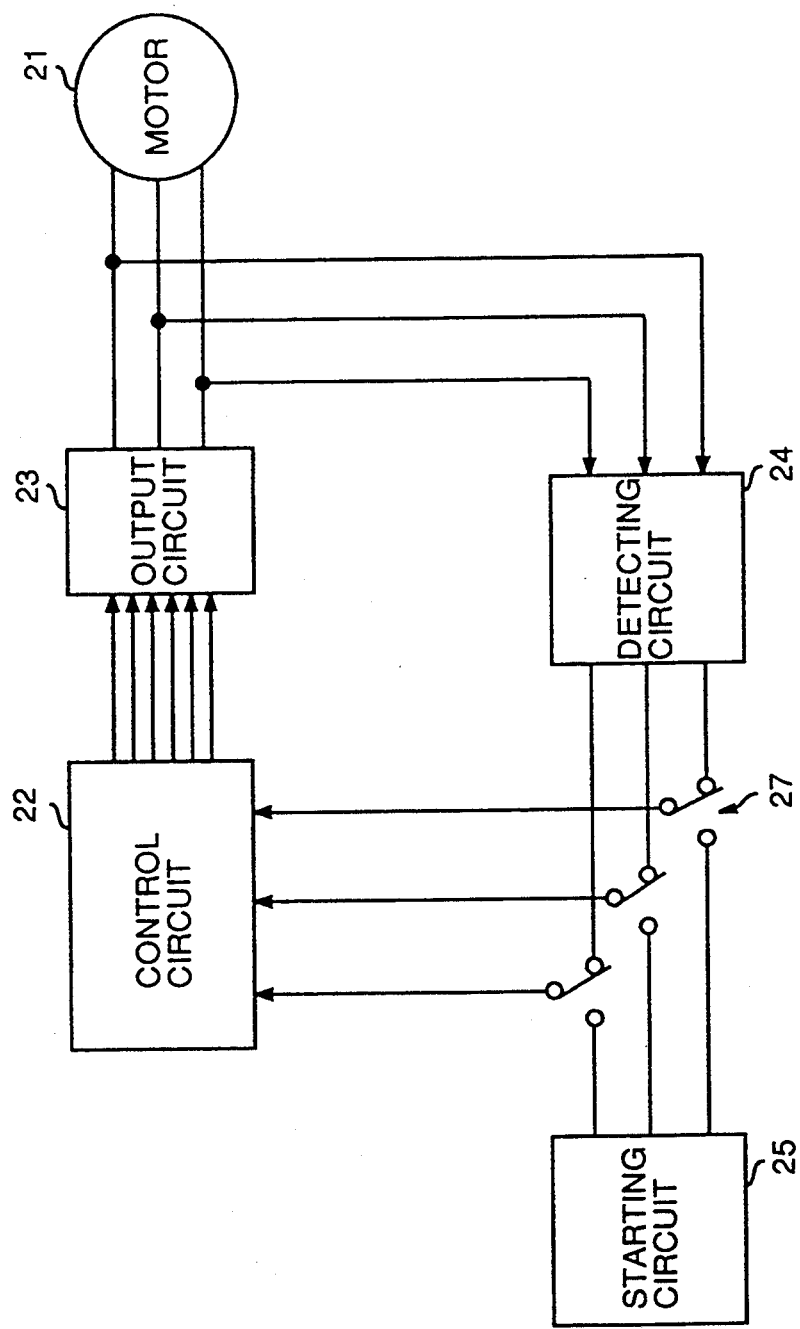
FIG. 10 is a schematic block diagram showing a driving control circuit of one example in the conventional technique.
Figure 11:
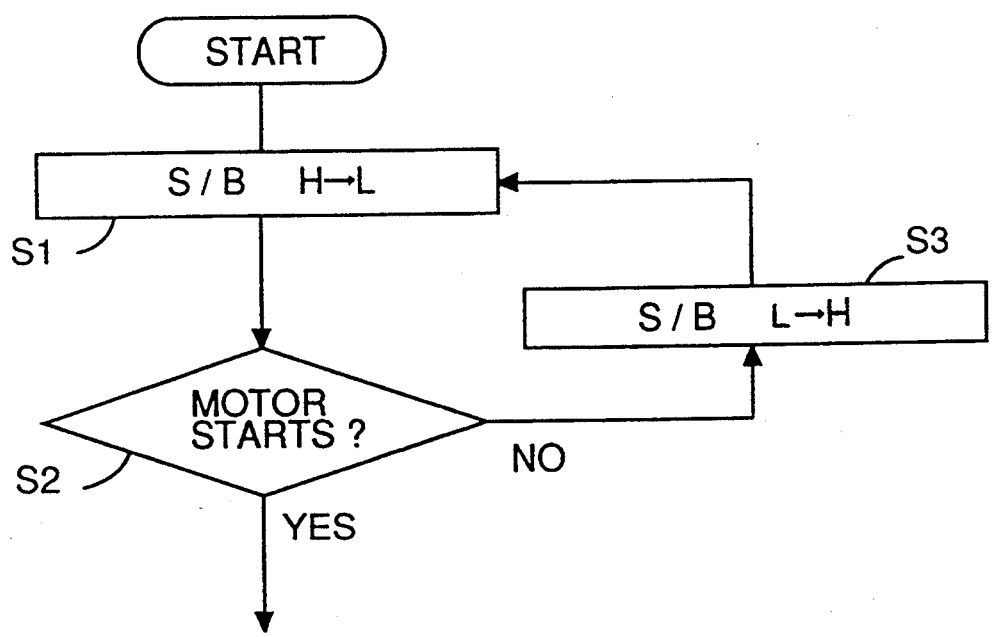
FIG. 11 is a flowchart showing a starting sequence in the driving control circuit in the prior art.

Therefore, in case where the motor is started satisfactorily with a starting current, the rotating speed of the motor goes up above the predetermined value as in curve r1 in FIG. 9, thus starting of motor results in success.

Even in the case where the specified rotating speed is not achieved in the initial starting step because of reverse rotation of motor, or the like reason, as in curve r2 in FIG. 9, it is available to achieve a steady rotating speed by inverting to the reversed exciting condition after the holding step and by reexecuting the starting step under the same condition as in the first. Accordingly, probability of failure of starting is substantially considered as zero.

As in Embodiment 1, the stepping step is executed by the reversed excitation after the holding step, and therefore larger torque is obtained at the early stage of the stepping step. By the way, both the initial stepping step and the initial accelerating/constant speed step, or the initial accelerating/constant speed step only can be dispensed with if sufficient torque is obtained in the stepping step.

Thus, the driving control circuit of the sensorless motor according to this embodiment, enables setting of the initial stepping and the stepping frequency by the reference frequency oscillator 15, the counters 16 and 18, the control logic 17 and the like. Thus, the failures in starting can be reduced and stable starting is possible because of the stepping step after the holding step as in Embodiments 1 and 2.

Moreover, the initial accelerating/constant speed step and the accelerating/constant step are executed respectively after the initial stepping step and the stepping step so that the motor can be reliably started up to the predetermined rotating speed in a shorter time.

While the invention has been described with reference to preferred embodiments 1 to 3 thereof, the invention is not limited to these embodiments, and changes in form and details can be made without departing form the scope of the invention.

For example, although in the driving control circuit of Embodiments 1 and 2, there has been described the settings of frequency 550 Hz for the high-frequency stepping step and frequency 55 Hz for the stepping step, the invention is not limited to these frequencies. For example, the high frequency stepping may be set within a higher frequency range, comparing with the proper vibration frequency, wherein vibration is not amplified, while the stepping frequency may be set about at the proper vibration frequency of the motor.

The constructions of the driving circuits of foregoing embodiments are not limited to one shown in FIGS. 1, 5 and 7. Particularly, circuits which sets frequencies of the high-frequency stepping, the initial stepping and the stepping, can be changed in many ways.

Furthermore, the invention can be applied to a case where a microcomputer and the like are used for controls similar to above-described ones. In that case, it is needless to say that many variations, improvements and combinations are possible.

Further, in the foregoing, the invention made by the inventor is described to the case where it is applied to the driving control circuit of the spindle motor of the magnetic disk device, as one of the field of utilization. However, the invention is not limited to this, and can be applied to a driving control circuit of a sensorless motor which is used in other devices such as an optical disk device or a laser printer.

Operational effects obtained by typical ones of the inventions disclosed herein are described as follows.

1) The holding step for holding a current-flowing condition of the driving coils is executed without inverting the switching of the current-flowings to the driving coils. And, after the holding step, the stepping step is executed where current flows to the driving coils are invertly switched and, in this reversely excited condition, a stepping signal for allowing the rotor to rotate in the predetermined direction is supplied to the driving coils. By these operation, rotating torque can be raised in the early stage of the stepping step, and starting ability can be improved.

2) It is possible to generate only vibration in the rotor, by way of executing the high-frequency stepping step in which the high-frequency stepping signal having a higher frequency than the frequency of the stepping signal is supplied to the driving coils before the holding step. This enables to prevent a head sticking against the magnetic disk when used in the magnetic disk device.

3) Before the holding step, is executed the initial stepping step where the initial stepping signal allowing the rotor to rotate in the specified direction is supplied to the driving coils. And, in this case, after the initial stepping step, is executed the initial accelerating/constant speed step wherein the initial accelerating/constant speed signal is supplied to the driving coils. By this, the motor can be started and achieve the predetermined rotating speed reliably and in a shorter time, meaning reliability of the starting operation, and reduced starting-time.

What is claimed is:

1. A method of starting a sensorless motor having a stator provided with multi-phase driving coils for generating an electromagnetic field, and a rotor provided with a permanent magnet by which a rotating force is obtained by electromagnetic interaction with the stator, comprising:

a sequencing step for exciting each multi-phase coil in a standard repeating sequence with respect to the other coils to rotate the sensorless motor in a predetermined direction;

a holding step temporarily suspending said sequencing step for holding a current-flowing condition of the driving coils without switching currents to the driving coils in order to store a potential energy in the driving coils;

a reverse exciting step resuming said sequencing step for inverting currents to said driving coils after said holding step in order to release the potential energy to increase the starting torque of the motor for more reliably starting the rotation of the rotor in a predetermined direction; and a stepping step in which a stepping signal for sustaining torque of the motor to enable said rotor to rotate in the predetermined direction is supplied to said driving coils.

2. A circuit for starting a sensorless motor having a stator provided with multi-phase driving coils for generating an electromagnetic field, and a rotor provided with a permanent magnet by which a rotating force is obtained by electromagnetic interaction with the stator, comprising:

a means for sequencing excitation of each multi-phase drive coil in a standard repeating sequence with respect to the other coils to rotate a sensorless motor in a predetermined direction;

a means for holding current-flowing conditions of the driving coils without switching currents to the driving coils in order to store potential energy in the driving coils, said means for holding temporarily suspending operation of said means for sequencing;

a reverse exciting means resuming operation of said means for sequencing for inverting currents to the driving coils in order to release the potential energy stored in the coils to increase a starting torque of the motor for more reliably starting the rotation of the rotor in a predetermined direction; and a stepping signal generating means for generating a stepping signal to said coils for sustaining torque of the motor to enable the rotor to rotate in the predetermined direction.

3. A circuit for starting a sensorless motor as defined in claim 2, wherein the sensorless motor is of the three-phase type.

* * * * *